United States Patent
Hölscher et al.

(10) Patent No.: US 12,441,953 B2
(45) Date of Patent: Oct. 14, 2025

(54) ISOMER MIXTURES OF UNSATURATED MACROCYCLIC MUSK COMPOUNDS

(71) Applicant: SYMRISE AG, Holzminden (DE)

(72) Inventors: Bernd Hölscher, Halle (DE); Wilhelm Wiedmann, Bevern (DE); Sven Siegel, Höxter (DE); Torsten Kulke, Höxter-Lüchtringen (DE)

(73) Assignee: SYMRISE AG, Holzminden (DE)

( * ) Notice: Subject to any disclaimer, the term of this patent is extended or adjusted under 35 U.S.C. 154(b) by 1486 days.

(21) Appl. No.: 15/324,600

(22) PCT Filed: Jul. 7, 2015

(86) PCT No.: PCT/EP2015/065429
§ 371 (c)(1),
(2) Date: Jan. 6, 2017

(87) PCT Pub. No.: WO2016/005361
PCT Pub. Date: Jan. 14, 2016

(65) Prior Publication Data
US 2017/0211014 A1    Jul. 27, 2017

(30) Foreign Application Priority Data
Jul. 7, 2014 (EP) .................... 14176002

(51) Int. Cl.
*C11B 9/00* (2006.01)
*C11D 3/50* (2006.01)
*A61L 9/01* (2006.01)

(52) U.S. Cl.
CPC .......... *C11B 9/0038* (2013.01); *C11B 9/0084* (2013.01); *C11D 3/50* (2013.01); *A61L 9/01* (2013.01)

(58) Field of Classification Search
CPC .................................................... C11B 9/0038
See application file for complete search history.

(56) References Cited

U.S. PATENT DOCUMENTS

| | | | |
|---|---|---|---|
| 4,568,470 A | 2/1986 | Lovern et al. | |
| 6,255,276 B1* | 7/2001 | Frater | C07D 313/00 |
| | | | 512/11 |
| 2005/0137120 A1* | 6/2005 | Reckziegel | C07C 49/487 |
| | | | 568/375 |
| 2008/0319244 A1* | 12/2008 | Surburg | C07C 45/67 |
| | | | 585/670 |
| 2013/0303432 A1* | 11/2013 | Holscher | A61Q 13/00 |
| | | | 512/11 |

FOREIGN PATENT DOCUMENTS

| | | |
|---|---|---|
| EP | 0 818 452 A2 | 1/1998 |
| EP | 1201738 A1 | 5/2002 |
| EP | 2 662 098 A1 | 11/2013 |
| WO | WO-03/037841 A1 | 3/2003 |
| WO | WO-2005/063670 A1 | 7/2005 |

OTHER PUBLICATIONS

International Search Report and Written Opinion, PCT/EP2015/065429.

* cited by examiner

*Primary Examiner* — Arrie L Reuther
(74) *Attorney, Agent, or Firm* — POLSINELLI PC

(57) ABSTRACT

Herein described are novel mixtures, containing or consisting of a first compound (E) and a second compound (Z), wherein compounds (E) and (Z) are compounds of formula (I) with identical constitutional formula

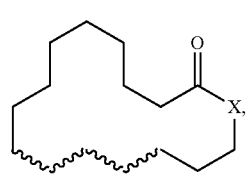

(I)

wherein it applies that one of the four wavy lines denotes a double bond and the remaining wavy lines denote a single bond, respectively, and X is selected from —O—, —CH$_2$— and —O—CH$_2$—,
and the first compound (E) is trans-configurated and the second compound (Z) is cis-configurated, wherein the weight ratio of compound (E) to compound (Z) in the mixture is in the range of 10:90 to 65:30, preferably to 65:35, particularly preferably to 60:40, uses of such mixtures, methods for producing such mixtures as well as products containing such mixtures.

21 Claims, No Drawings

ISOMER MIXTURES OF UNSATURATED MACROCYCLIC MUSK COMPOUNDS

CROSS-REFERENCE TO RELATED APPLICATIONS

This application is a national stage application (under 35 U.S.C. § 371) of PCT/EP2015/065429, filed Jul. 7, 2015, which claims benefit of European Application No. 14176002.5, filed Jul. 7, 2014, which are incorporated herein by reference in their entireties.

The present invention primarily relates to novel mixtures, containing or consisting of a first compound (E) and a second compound (Z), wherein compounds (E) and (Z) are compounds of formula (I) with identical constitutional formula

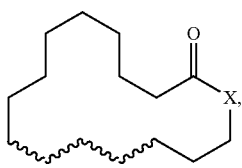

(I)

wherein it applies that one of the four wavy lines denotes a double bond and the remaining wavy lines denote a single bond, respectively, and X is selected from —O—, —CH$_2$— and —O—CH$_2$—,
and the first compound (E) is trans-configured and the second compound (Z) is cis-configured, wherein the weight ratio of compound (E) to compound (Z) in the mixture is in the range of 10:90 to 65:30, preferably to 65:35, particularly preferably to 60:40,
wherein the mixture comprises one or several compounds selected from the group consisting of cyclohexadec-8-en-1-one, oxacyclohexadecen-2-one, 17-oxacycloheptadec-9-en-1-one, particularly (9Z)-17-oxacycloheptadec-9-en-1-one, and cyclohexadec-5-en-1-one, with the proviso that in case of cyclohexadec-8-en-1-one the weight ratio of compound (E) to compound (Z) in the mixture is not 40.6:30.5 or 20:10,
and with the proviso that in case of cyclohexadec-5-en-1-one the weight ratio of compound (E) to compound (Z) in the mixture is not 37:62.

Moreover, the present invention relates to perfumed products containing a mixture according to the invention (as described herein), methods for producing mixtures according to the invention, methods for producing perfumed products according to the invention as well as preferred uses of mixtures according to the invention, particularly (a) for masking or reducing the or one or several unpleasant olfactory impressions of one or several unpleasantly smelling substances, and/or (b) for enhancing the or one or several pleasant olfactory impressions of one or several pleasantly smelling substances.

Further aspects and preferred embodiments of the present invention arise from the following description, the examples as well as particularly the enclosed patent claims.

In general, there is an ongoing need on the part of the perfume industry to enhance (emphasise/intensify) pleasant olfactory aspects of fragrance substances and to mask or reduce unpleasant olfactory aspects. Particularly, the fragrance substances described herein that are advantageously preferably to be combined with compounds of formula (I) to be used according to the invention, play an important role in perfumery. Thereby, it is desired to particularly emphasise their natural freshness and/or charisma on one hand and to develop new effects on the other hand.

Thus, it was the primary object of the present invention to provide alternative or preferably improved substances (substances or substance mixtures) for alteration or influencing of olfactory aspects, in particular to specify positive effects in combination with aldehydes and alcohols.

These substances thereby preferably ought to meet one, several or preferably all of the following requirements:
easy access,
high efficacy at low concentration, preferably with an inherent odor that is not or hardly detectable at low concentrations,
complete colourlessness or colourlessness to a large extent,
high stability in various mixtures or preparations, wherein in particular no discolouration and/or separation and/or turbidity shall occur,
inert behaviour,
no toxic and/or allergenic effect towards humans.

Furthermore, with the present invention particularly novel, advantageous fragrance substance mixtures, mainly perfume oils, that contain such substances, shall be provided. Such fragrance substance mixtures preferably shall be suitable to fragrance or perfume, respectively, certain products.

Moreover, products perfumed accordingly as well as methods for producing such products shall be provided.

Further objects that underlie the present invention arise from the following explanations and the enclosed patent claims.

The primary object of the present invention is solved by a mixture, containing or consisting of a first compound (E) and a second compound (Z), wherein compounds (E) and (Z) are compounds of formula (I) with identical constitutional formula

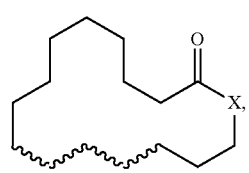

(I)

wherein it applies that one of the four wavy lines denotes a double bond and the remaining wavy lines denote a single bond, respectively, and X is selected from —O—, —CH$_2$— and —O—CH$_2$—,
and the first compound (E) is trans-configured and the second compound (Z) is cis-configured, wherein the weight ratio of compound (E) to compound (Z) in the mixture is in the range of 10:90 to 65:30, preferably to 65:35, particularly preferably to 60:40,
wherein the mixture comprises one or several compounds selected from the group consisting of cyclohexadec-8-en-1-one, oxacyclohexadecen-2-one, 17-oxacycloheptadec-9-en-1-one, particularly (9Z)-17-oxacycloheptadec-9-en-1-one, and cyclohexadec-5-en-1-one,
with the proviso that in case of cyclohexadec-8-en-1-one the weight ratio of compound (E) to compound (Z) in the mixture is not 40.6:30.5 or 20:10, and with the proviso that in case of cyclohexadec-5-en-1-one the weight ratio of compound (E) to compound (Z) in the mixture is not 37:62.

In the context of the mixtures described herein, preferably the proviso applies that in case of cyclohexadec-8-en-1-one the weight ratio of compound (E) to compound (Z) in the mixture is not in the range of 35:25 to 45:35 or in the range of 19:9 to 21:11, and/or the proviso that in case of cyclohexadec-5-en-1-one the weight ratio of compound (E) to compound (Z) in the mixture is not in the range of 32:57 to 42:67.

Surprisingly the novel the mixtures (as described herein) are very well suitable to effect a positive influence on (other) fragrance substances, particularly on such fragrance substances as described herein, mainly on aldehydes and alcohols.

The compound of formula (I) to be used according to the invention or mixtures as described herein furthermore are advantageously easily accessible or producible. Preferred methods for producing a mixture according to the invention are described further below.

Moreover, the compounds to be used according to the invention or the mixtures according to the invention described herein display a high efficacy already at low concentrations, particularly at concentrations at which the compounds of formula (I) have no or at least only a hardly detectable inherent odor, they advantageously are colourless to a large extent or completely colourless, have high stability in different mixtures or preparations and do not have any toxic and/or allergenic effect on humans.

Furthermore compounds of formula (I) or the mixtures according to the invention described herein, respectively, have the advantage that during their use, particularly a use according to the invention, can be combined with different fragrance substances and perfume oils or usual components of a perfume oil, respectively, to perfume products with any desired scent. Thus, a large selection of scent types can be offered to the consumers by means of the present invention. Fragrance substance mixtures and perfumed products according to the invention containing one or several compounds of formula (I) are described further below.

A mixture according to the invention comprises one or several compounds selected from the group consisting of cyclohexadec-8-en-1-one (Aurelione, CAS No. 88642-03-9, 3100-36-5; Globanone, CAS No. 3100-36-5), oxacyclohexadecen-2-one (Globalide, CAS No. 34902-57-3, 111879-80-2), 17-oxacycloheptadec-9-en-1-one, particularly (9Z)-17-oxacycloheptadec-9-en-1-one (Ambrettolide, CAS No. 28645-51-4), and cyclohexadec-5-en-1-one (Velvione, CAS No. 37609-25-9). I.e., the compounds of formula (I) contained in a mixture according to the invention or at least one compound of formula (I) is/are selected from the group of the above-named compounds.

A mixture according to the invention is particularly preferred that comprises or consists of an isomer mixture of trans- and cis-configured cyclohexadec-8-en-1-one and/or of trans- and cis-configured oxacyclohexadecen-2-one and/or of trans- and cis-configured 17-oxacycloheptadec-9-en-1-one and/or of trans- and cis-configured cyclohexadec-5-en-1-one. Particularly preferably, the (respective) weight ratio of compound (E) to compound (Z) (as described herein) in such a mixture is in the range of 10:90 to 60:40.

In this context, it shall be exemplarily referred to the following results of the investigation of the olfactory properties of mixtures according to the invention (and comparative mixtures):

The olfactory properties of selected isomer mixtures of cyclohexadec-8-en-1-one can be described as follows:
67% trans-cyclohexadec-8-en-1-one: 31% cis-cyclohexadec-8-en-1-one (according to the invention):
musk-like, erogenous, cosmetic, balsamic scent and floral aspects
60% trans-cyclohexadec-8-en-1-one: 40% cis-cyclohexadec-8-en-1-one (according to the invention):
musk-like, erogenous, balsamic, reminding of fresh forest air
40% trans-cyclohexadec-8-en-1-one: 60% cis-cyclohexadec-8-en-1-one (according to the invention):
musk-like, erogenous, transparent, reminding of cool sea air
20% trans-cyclohexadec-8-en-1-one: 80% cis-cyclohexadec-8-en-1-one (according to the invention):
musk-like, erogenous, warm, reminding of dry wood.

The olfactory properties of selected isomer mixtures of 17-oxacycloheptadec-10-en-1-one can be described as follows:
99% trans-17-oxacycloheptadec-9-en-1-one: 1% cis-17-oxacycloheptadec-9-en-1-one (comparative mixture):
musk-like, erogenous, mild ambergris-like, with floral aspects and little fruity nuances
65% trans-17-oxacycloheptadec-9-en-1-one: 30% cis-17-oxacycloheptadec-9-en-1-one (according to the invention):
musk-like, erogenous, stronger ambergris-like with more fatty, animalistic nuances. The floral and fruity shades olfactorily recede into the background.

The olfactory properties of selected isomer mixtures of oxacyclohexadecen-2-one can be described as follows:
72% trans-oxacyclohexadecen-2-one: 22% cis-oxacyclohexadecen-2-one (comparative mixture):
musk-like, erogenous, fatty-ambergris-like with a dry-wooden and subtle fruity orientation
65% trans-oxacyclohexadecen-2-one: 31% cis-oxacyclohexadecen-2-one (according to the invention):
musk-like, erogenous, intensive tallowy-ambergris-like, more reminding of skin, particularly of cleaned wool fat.

The olfactory properties of selected isomer mixtures of cyclohexadec-5-en-1-one can be described as follows:
37% trans-cyclohexadec-5-en-1-one: 62% cis-cyclohexadec-5-en-1-one (according to the invention):
musk-like, erogenous, mild-ambergris-like musk-like, erogenous, mild-animalistic with a soft-cosmetic and transparent-floral scent
21% trans-cyclohexadec-5-en-1-one: 78% cis-Cyclohexadec-5-en-1-one (according to the invention):
musk-like, erogenous, weaker animalistic with a balsamic, warm scent reminding of tree- and shrub resins.

Preferably, the mixture according to the invention is a fragrance substance mixture, particularly a perfume oil. Such fragrance substance mixture preferably contains one or several additional fragrance substances. Particularly preferably the additional or one, several or all of the additional fragrance substances is or are selected from the group consisting of alcohols, aldehydes, ketones, ethers, esters and carboxylates, preferably alcohols and aldehydes, in particular such with a molar mass the range of 150 to 285 g/mol, preferably of 210 g/mol or less.

In the context of the present invention it applies in general that the fragrance substances additionally contained in a fragrance substance mixture according to the invention have a molar mass in the range of 150 to 285 g/mol, preferably of 210 g/mol or less. Fragrance substances to be used particularly preferably are described further below.

In the following, positive influences of the mixtures according to the invention described herein on selected, so-called "measurement fragrance substances" (molecular single fragrance substances as representatives of the chemical functional groups of aldehydes and alcohols) are described—exemplarily by means of investigated isomer mixtures of cyclohexadec-8-en-1-one (as described herein):

Aldehydes:

Dodecanal is an aliphatic aldehyde with a fatty, waxy smell, that also often is called a typical "fresh laundry scent".

With an addition of 10% (with regard to the total weight of dodecanal) of an isomer mixture of cyclohexadec-8-en-1-one (here: 40% trans-cyclohexadec-8-en-1-one: 60% cis-cyclohexadec-8-en-1-one) to this single fragrance substance, surprisingly a very positive smell of citrus fruits, especially of mandarins is detectable.

2-Methyl undecanal, also known as iso-dodencal or "M.N.A", has a very strong scent that is described as "dry", "ambergris-like" and "herbaceous".

An addition of 10% (with regard to the total weight of 2-methyl undecanal of an isomer mixture of cyclohexadec-8-en-1-one (here: 60% trans-cyclohexadec-8-en-1-one: 40% cis-cyclohexadec-8-en-1-one) convinces with a diffuse scent reminding of orange peel.

Hexyl cinnamic aldehyde, alpha, is an iso-cyclic aldehyde form with a mild, slightly herbal and weakly floral scent and through the addition of 10% (with regard to the total weight of hexyl cinnamic aldehyde) of an isomer mixture of cyclohexadec-8-en-1-one (here: 40% trans-cyclohexadec-8-en-1-one: 60% cis-cyclohexadec-8-en-1-one) undergoes a higher-quality, fine-floral scent development to fresh blossoms of the jasmine shrub.

Alcohols:

Dimethyloctenol, generally known as "citronellol", shows a smell of rose blossoms and lilies of the valley in its racemic form.

When this molecular single fragrance substance is supplemented with a tenth of its proportion by an isomer mixture of cyclohexadec-8-en-1-one (here: 40% trans-cyclohexadec-8-en-1-one: 60% cis-cyclohexadec-8-en-1-one), then, contrary to expectation, the clear, fresh slightly minty olfactory impression of the laevo-form of the molecule is obtained that distinctly smells of the fresh leaves of the scented-leaved pelargonium shrub.

Dimethyloctadienol, industrially known as "linalool", with an authentic, floral-wooden smell with a slight citrus influence, gains the elegant-fruity scent impression of the freesia flower through the addition of 10% (with regard to the total weight of dimethyloctadienol) of an isomer mixture of cyclohexadec-8-en-1-one (here: 60% trans-cyclohexadec-8-en-1-one: 40% cis-cyclohexadec-8-en-1-one).

Within the scope of the present invention, the "measurement fragrance substances" described above are particularly preferably used fragrance substances in combination with compounds of formula (I) (as described herein) in fragrance substance mixtures according to the invention.

In connection with the fragrance substance mixtures according to the invention described herein it applies that the ratio of the total mass of fragrance substances that do not correspond to formula (I) to the total mass of compound(s) of formula (I) preferably is higher or equal to 80:20, preferably higher or equal to 90:10, particularly preferably higher than or equal to 95:5.

Particularly preferred amount(-ratios) according to the invention arise from the enclosed examples.

Fragrance substance mixtures according to the invention are usually liquid at 25° C. and 1013 hPa and normally are homogeneous solutions.

Fragrance substance mixtures, particularly perfume oils, often comprise synthetic or natural (preferably) taste and odor neutral carrier oils, which contain the scent or fragrance substance (as artificial or natural substances) in highly concentrated form (as well as perfumistic solvents and/or auxiliary materials, if applicable). The same applies accordingly to the fragrance substance mixtures according to the invention described herein.

Perfume oils (as preferred embodiment of fragrance substance mixtures (according to the invention)) often serve scent applications. Perfumes, for example, are produced with perfume oils by adding them to (e.g. alcoholic) solutions that "carry away" the scent- or fragrance substance during evaporation and thus convey the sensory impression of a certain odor to the olfactory organ of the user, i.e. the person. Such mixtures can be, for example, a perfume, eau de parfum or eau de toilette. Furthermore, perfume oils serve the generation of a certain scent in living rooms, such as for example during the use of fragrance lamps, nebulizers or diffusers. Furthermore, perfume oils can also be used in a variety of further products or preparations, respectively, for example in shoe creams to hair shampoos, sanitary towels to toilet cleaners, face creams to washing powder and cat stones.

Examples for fragrance substances that generally preferably can be used as component of a fragrance substance mixture according to the invention, particularly a perfume oil according to the invention, can be found for example in S. Arctander, Perfume and Flavor Chemicals, Vol. I and II, Montclair, N. J., 1969, author's edition or H. Surburg, J. Panten, Common Fragrance and Flavor Materials, $5^{th}$ Ed., Wiley-VCH, Weinheim 2006.

Preferred ethereal oils, concretes, absolutes, resins, resinoids, balsams and/or tinctures, that can be a component of a fragrance substance mixture according to the invention, particularly a perfume oil according to the invention, are preferably to be selected from the group consisting of:

Ambergris tincture; amyris oil; angelica seed oil; angelica root oil; aniseed oil; valerian oil; basil oil; tree moss absolute; bay oil; mugwort oil; benzoin resin; bergamot oil; beeswax absolute; birch tee oil; bitter almond oil; savory oil; bucco leaf oil; cabreuva oil; cade oil; calmus oil; camphor oil; cananga oil; cardamom oil; cascarilla oil; cassia oil; cassie absolute; castoreum absolute; cedar leaf oil; cedar wood oil; cistus oil; citronella oil; citrus oil; copaiva balsam; copaiva balsam oil; coriander oil; costus root oil; cumin oil; cypress oil; davana oil; dill weed oil; dill seed oil; eau de brouts absolute; oakmoss absolute; elemi oil; estragon oil; *eucalyptus citriodora* oil; *eucalyptus* oil; fennel oil; spruce needle oil; galbanum oil; galbanum resin; geranium oil; grapefruit oil; guaiacwood oil; gurjun balsam; gurjun balsam oil; helichrysum absolute; helichrysum oil; ginger oil; iris root absolute; iris root oil; jasmine absolute; calamus oil; chamomile oil blue; chamomile oil roman; carrot seed oil; cascarilla oil; pine needle oil; spearmint oil; caraway oil; labdanum oil; labdanum absolute; labdanum resin; lavandin absolute; lavandin oil; lavender absolute; lavender oil; lemongrass oil; lovage oil; lime oil distilled; lime oil squeezed; linaloe oil; *litsea cubeba* oil; bay leaf oil; macis oil; Marjoram oil; mandarin oil; massoia bark oil; mimosa absolute; musk seed oil; musk tincture; muscatel sage oil; nutmeg oil; myrrh absolute; myrrh oil; myrtle oil; carnation leaf oil;

carnation blossom oil; neroli oil; olibanum absolute; olibanum oil; opopanax oil; orange blossom absolute; orange oil; origanum oil; palmarosa oil; patchouli oil; perilla oil; peru balsam oil; parsley leaf oil; parsley seed oil; petitgrain oil; peppermint oil; pepper oil; allspice oil; pine oil; poley oil; rose absolute; rosewood oil; rose oil; rosemary oil; sage oil Dalmatian; sage oil Spanish; sandalwood oil; celery seed oil; spike lavender oil; star aniseed oil; styrax oil; tagetes oil; fir needle oil; tea tree oil; turpentine oil; thyme oil; tolu balsam; tonka absolute; tuberose absolute; vanilla extract; violet leaf absolute; verbena oil; vetiver oil; juniper berry oil; wine yeast oil; vermouth oil; wintergreen oil; ylang oil; ysop oil; civet absolute; cinnamon leaf oil; cinnamon bark oil.

Preferred single fragrance substances that can be preferably used as component of a fragrance substance mixture according to the invention, particularly of a perfume oil according to the invention, are selected from the group of
hydrocarbons, thereby preferred 3-carene; α-pinene; β-pinene; α-terpinenes; γ-terpinenes; p-cymene; bisabolene; camphene; caryophyllene; cedrene; farnesene; limonene; longifolene; myrcene; ocimene; valencene; (E,Z)-1,3,5-undecatriene; styrene; diphenylmethane;
aliphatic alcohols, thereby preferred hexanol; octanol; 3-octanol; 2,6-dimethylheptanol; 2-methyl-2-heptanol; 2-methyl-2-octanol; (E)-2-hexenol; (E)- and (Z)-3-hexenol; 1-octen-3-ol; mixture of 3,4,5,6,6-pentamethyl-3/4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol;
aliphatic aldehydes and their acetals, thereby preferred hexanal; heptanal; octanal; nonanal; decanal; undecanal; dodecanal; tridecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-9-undecenal; 2,6,10-trimethyl-5,9-undecadienal; heptanal diethylacetal; 1,1-dimethoxy-2,2,5-trimethyl-4-hexene; citronellyl oxyacetaldehyde; 1-(1-methoxy-propoxy)-(E/Z)-3-hexene;
aliphatic ketones and their oximes, thereby preferred 2-heptanone; 2-octanone; 3-octanone; 2-nonanone; 5-methyl-3-heptanone; 5-methyl-3-heptanone oxime; 2,4,4,7-tetramethyl-6-octene-3-one; 6-methyl-5-heptene-2-one;
aliphatic sulphur-containing compounds, thereby preferred 3-methylthio-hexanol; 3-methylthiohexyl acetate; 3-mercaptohexanol; 3-mercaptohexyl acetate; 3-mercaptohexyl butyrate; 3-acetylthiohexyl acetate; 1-menthene-8-thiol;
aliphatic nitriles, thereby preferred 2-nonenoic acid nitrile; 2-undecenoic acid nitrile; 2-tridecenoic acid nitril; 3,12-tridecadienoic acid nitrile; 3,7-dimethyl-2,6-octadienoic acid nitrile; 3,7-dimethyl-6-octenoic acid nitril;
esters of aliphatic carboxylic acids, thereby preferred (E)- and (Z)-3-hexenyl formate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl-isobutyrate; hexyl crotonate; ethyl isovalerate; ethyl-2-methylpentanoate; ethyl hexanoate; allyl hexanoate; ethyl heptanoate; allyl heptanoate; ethyl octanoate; ethyl-(E,Z)-2,4-decadienoate; methyl-2-octinate; methyl-2-noninate; allyl-2-isoamyl oxyacetate; methyl-3,7-dimethyl-2,6-octadienoate;4-methyl-2-pentyl-crotonate;
acyclic terpene alcohols, thereby preferred citronellol; geraniol; Nerol; linalool; lavadulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol 2,6-dimethyl-2,5,7-octatrien-1-ol; as well as their formates, acetates, propionates, isobutyrates, butyrates, isovalerianates, pentanoates, hexanoates, crotonates, tiglinates and 3-methyl-2-butenoates;
acyclic terpene aldehydes and -ketones, thereby preferred geranial; neral; citronellal; 7-hydroxy-3,7-dimethyloctanal; 7-methoxy-3,7-dimethyloctanal; 2,6,10-trimethyl-9-undecenal; geranyl acetone; as well as the dimethyl- and diethyl acetals of geranial, neral, 7-hydroxy-3,7-dimethyloctanal;
cyclic terpene alcohols, thereby preferred isopulegol; alpha-terpineol; terpinenol-4; menthan-8-ol; menthan-1-ol; menthan-7-ol; borneol; isoborneol; linalool oxide; nopol; cedrol; ambrinol; vetiverol; guaiol; as well as their formates, acetates, propionates, isobutyrates, butyrates, isovalerianates, pentanoates, hexanoates, crotonates, tiglinates and 3-methyl-2-butenoates; menthyl formate; menthyl propionate; menthyl butyrate; menthyl isobutyrate; menthyl isovalerianate; menthyl hexanoate; menthyl crotonate; menthyl tiglinate;
cyclic terpene aldehydes and -ketones, thereby preferred menthone; isomenthone; 8-mercaptomenthan-3-one; carvone; camphor; fenchone; alpha-ionone; beta-ionone; beta-n-methyl ionone; beta-isomethyl ionone; alpha-irone; alpha-damascone; beta-damascone; beta-damascenone; delta-damascon; gamma-damascon; 1-(2,4,4-trimethyl-2-cyclohexen-1-yl)-2-buten-1-one; 1,3,4,6,7,8a-hexahydro-1,1,5,5-tetramethyl-2H-2,4a-methanonaphthalen-8(5H)-one; 2-methyl-4-(2,6,6-trimethyl-1-cyclohexen-1-yl)-2-butenal; nootkatone; dihydronootkatone; 4,6,8-megastigmatrien-3-one; alpha-sinensal; beta-sinensal; acetylated cedarwood oil (methyl cedryl ketone);
cyclic alcohols, thereby preferred 4-tert.-butylcyclohexanol; 3,3,5-trimethylcyclohexanol; 3-isocamphylcyclohexanol; 2,6,9-trimethyl-Z2,Z5,E9-cyclododecatrien-1-ol; 2-isobutyl-4-methyltetrahydro-2H-pyran-4-ol;
cycloaliphatic alcohols, thereby preferred alpha,3,3-trimethylcyclohexylmethanol; 1-(4-isopropylcyclohexyl)ethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-o1; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;
cyclic and cycloaliphatic ethers, thereby preferred cineol; cedryl methyl ether; cyclododecyl methyl ether; 1,1-dimethoxycyclododecane; (ethoxymethoxy)cyclododecane; alpha-cedrene epoxide; 3a,6,6,9a-tetramethyldodecahydronaphtho[2,1-b]furan; 3a-ethyl-6,6,9a-trimethyldodecahydronaphtho[2,1-b]furan; 1,5,9-trimethyl-13-oxabicyclo[10.1.0]trideca-4,8-diene; rose oxide; 2-(2,4-dimethyl-3-cyclohexen-1-yl)-5-methyl-5-(1-methylpropyl)-1,3-dioxane; cyclic and macrocyclic ketones, thereby preferred 4-tert.-butyl cyclohexanone; 2,2,5-trimethyl-5-pentyl cyclopentanone; 2-heptyl cyclopentanone; 2-pentyl cyclopentanone; 2-hydroxy-3-methyl-2-cyclopenten-1-one; 3-methyl-cis-2-penten-1-yl-2-cyclopenten-1-one; 3-methyl-2-pentyl-2-cyclopenten-1-one; 3-methyl-4-cyclopentadecenone; 3-methyl-5-cyclopentadecenone; 3-methylcyclopentadecanone; 4-(1-ethoxyvinyl)-3,3,5,5-tetramethylcyclohexanone; 4-tert.-pentylcyclohexanone; 5-cyclohexadecen-1-one; 6,7-dihydro-1,1,2,3,3-pentamethyl-4(5H)-indanone; 8-cyclohexadecen-1-one; 9-cycloheptadecen-1-one; cyclopentadecanone; cyclohexadecanone;

cycloaliphatic aldehydes, thereby preferred 2,4-dimethyl-3-cyclohexene carbaldehyde; 2-methyl-4-(2,2,6-trimethyl-cyclohexen-1-yl)-2-butenal; 4-(4-hydroxy-4-methylpentyl)-3-cyclohexene carbaldehyde; 4-(4-methyl-3-penten-1-yl)-3-cyclohexene carbaldehyde;

cycloaliphatic ketones, thereby preferred 1-(3,3-dimethylcyclohexyl)-4-penten-1-one; 2,2-dimethyl-1-(2,4-dimethyl-3-cyclohexen-1-yl)-1-propanone; 1-(5,5-dimethyl-1-cyclohexen-1-yl)-4-penten-1-one; 2,3,8,8-tetramethyl-1,2,3,4,5,6,7,8-octahydro-2-naphtalenylmethylketone; methyl-2,6,10-trimethyl-2,5,9-cyclododecatrienylketone; tert.-butyl-(2,4-dimethyl-3-cyclohexen-1-yl)ketone;

esters of cyclic alcohols, thereby preferred 2-tert-butylcyclohexyl acetate; 4-tert-butylcyclohexyl acetate; 2-tert-pentylcyclohexyl acetate; 4-tert-pentylcyclohexyl acetate; 3,3,5-trimethylcyclohexyl acetate; decahydro-2-naphthyl acetate; 2-cyclopentylcyclopentyl crotonate; 3-pentyltetrahydro-2H-pyran-4-yl acetate; decahydro-2,5,5,8a-tetramethyl-2-naphthyl acetate; 4,7-methano-3a,4,5,6,7,7a-hexahydro-5, or 6-indenyl acetate; 4,7-methano-3a,4,5,6,7,7a-hexahydro-5, or 6-indenyl propionate; 4,7-methano-3a,4,5,6,7,7a-hexahydro-5, or 6-indenyl isobutyrate; 4,7-methanooctahydro-5, or 6-indenyl acetate;

esters of cycloaliphatic alcohols, preferably 1-cyclohexylethyl crotonate;

esters of cycloaliphatic carboxylic acids, thereby preferred allyl-3-cyclohexyl propionate; allyl cyclohexyloxy acetate; cis- and trans-methyldihydrojasmonate; cis- and trans-methyljasmonate; methyl-2-hexyl-3-oxocyclopentane carboxylate; ethyl-2-ethyl-6,6-dimethyl-2-cyclohexene carboxylate; ethyl-2,3,6,6-tetramethyl-2-cyclohexene carboxylate; ethyl-2-methyl-1,3-dioxolane-2-acetate;

araliphatic alcohols, thereby preferred benzyl alcohol; 1-phenylethyl alcohol; 2-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenylethyl alcohol; 1,1-dimethyl-3-phenylpropanol; 1-ethyl-1-methyl-3-phenylpropanol; 2-methyl-5-phenylpentan-1-ol; 3-methyl-5-phenylpentanol; 3-phenyl-2-propen-1-ol; 4-methoxybenzyl alcohol; 1-(4-isopropylphenyl) ethanol;

esters of araliphatic alcohols and aliphatic carboxylic acids, thereby preferred benzyl acetate; benzyl propionate; benzyl isobutyrate; benzyl isovalerianate; 2-phenylethyl acetate; 2-phenylethyl propionate; 2-phenylethyl isobutyrate; 2-phenylethyl isovalerianate; 1-phenylethyl acetate; alpha-trichloromethyl benzyl acetate; alpha,alpha-dimethylphenylethyl acetate; alpha,alpha-dimethylphenylethyl butyrate; cinnamyl acetate; 2-phenoxyethyl isobutyrate; 4-methoxybenzyl acetate;

araliphatic ethers, thereby preferred 2-phenylethyl methyl ether; 2-phenylethyl isoamyl ether; 2-phenylethyl-1-ethoxyethyl ether; phenyl acetaldehyde dimethyl acetal; phenyl acetaldehyde diethyl acetal; hydratropic aldehyde dimethyl acetal; phenyl acetaldehyde glyceryl acetal; 2,4,6-trimethyl-4-phenyl-1,3-dioxane; 4,4a,5,9b-tetrahydroindeno[1,2-d]m-dioxine; 4,4a,5,9b-tetrahydro-2,4-dimethylindeno[1,2-d]-m-dioxine;

aromatic and araliphatic aldehydes, thereby preferred benzaldehyde; phenyl acetaldehyde; 3-Phenyl propanal; hydratropic aldehyde; 4-methyl benzaldehyde; 4-methylphenyl acetaldehyde; 3-(4-ethylphenyl)-2,2-dimethyl propanal; 2-methyl-3-(4-isopropylphenyl) propanal; 2-methyl-3-(4-tert.-butylphenyl)propanal; 2-methyl-3-(4-isobutylphenyl)propanal; 3-(4-tert.-butylphenyl)propanal; cinnamic aldehyde; alpha-butyl cinnamic aldehyde; alpha-amyl cinnamic aldehyde; alpha-hexyl cinnamic aldehyde; 3-methyl-5-phenylpentanal; 4-methoxy benzaldehyde; 4-hydroxy-3-ethoxy benzaldehyde; 3,4-methylendioxy benzaldehyde; 3,4-dimethoxy benzaldehyde; 2-methyl-3-(4-methoxyphenyl)propanal; 2-methyl-3-(4-methylendioxyphenyl)propanal;

aromatic and araliphatic ketones, thereby preferred acetophenone; 4-methylacetophenone; 4-methoxyacetophenone; 4-tert.-butyl-2,6-dimethylacetophenone; 4-phenyl-2-butanone; 4-(4-hydroxyphenyl)-2-butanone; 1-(2-naphthalenyl)ethanone; 2-benzofuranylethanone; (3-methyl-2-benzofuranyl)ethanone; benzophenone; 1,1,2,3,3,6-hexamethyl-5-indanylmethylketone; 6-tert.-butyl-1,1-dimethyl-4-indanylmethylketone; 1-[2,3-dihydro-1,1,2,6-tetramethyl-3-(1-methylethyl)-1H-5-indenyl]ethanone; 5',6',7,8'-tetrahydro-3',5',5',6',8',8'-hexamethyl-2-acetonaphthone;

aromatic and araliphatic carboxylic acids and their esters, thereby preferred benzoic acid; Phenylacetic acid; methyl benzoate; ethyl benzoate; hexyl benzoate; methyl phenylacetate; ethyl phenylacetate; geranyl phenylacetate; phenylethyl-phenyl acetate; methyl cinnamate; ethyl cinnamate; benzyl cinnamate; phenylethyl cinnamate; cinnamyl cinnamate; allylphenoxy acetate; methyl salicylate; isoamyl salicylate; hexyl salicylate; cyclohexyl salicylate; cis-3-hexenyl salicylate; benzyl salicylate; phenylethyl salicylate; methyl-2,4-dihydroxy-3,6-dimethyl benzoate; ethyl-3-phenylglycidate; ethyl-3-methyl-3-phenylglycidate;

nitrogen-containing aromatic compounds, thereby preferred 2,4,6-trinitro-1,3-dimethyl-5-tert.-butylbenzene; 3,5-dinitro-2,6-dimethyl-4-tert.-butyl acetophenone; cinnamic acid nitrile; 3-methyl-5-phenyl-2-pentenoic acid nitrile; 3-methyl-5-phenylpentanoic acid nitrile; methyl anthranilate; methy-N-methyl anthranilate; Schiff bases of methyl anthranilate with 7-hydroxy-3,7-dimethyloctanal, 2-methyl-3-(4-tert.-butylphenyl) propanal or 2,4-dimethyl-3-cyclohexene carbaldehyde; 6-isopropyl chinolin; 6-isobutyl chinolin; 6-sec.-butyl chinolin; 2-(3-phenylpropyl)pyridine; indole; skatole; 2-methoxy-3-isopropyl pyrazine; 2-isobutyl-3-methoxy pyrazine;

phenols, phenyl ethers and phenyl esters, thereby preferred estragol; anethol; eugenol; eugenyl methyl ether; isoeugenol; isoeugenyl methyl ether; thymol; carvacrol; diphenyl ether; beta-naphthyl methyl ether; beta-naphthyl ethyl ether; beta-naphthyl isobutyl ether; 1,4- dimethoxybenzene; eugenyl acetate; 2-methoxy-4-methylphenol; 2-ethoxy-5-(1-propenyl)phenol; p-cresyl phenyl acetate;

heterocyclic compounds, thereby preferred 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

lactones, thereby preferred 1,4-octanolide; 3-methyl-1,4-octanolide; 1,4-nonanolide; 1,4-decanolide; 8-decen-1,4-olide; 1,4-undecanolide; 1,4-dodecanolide; 1,5-decanolide; 1,5-dodecanolide; 4-methyl-1,4-decanolide; 1,15-pentadecanolide; cis- and trans-11-pentadecen-1,15-olide; cis- and trans-12-pentadecen-1,15-olide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene-1,13-tridecandioate; coumarin; 2,3-dihydrocoumarin; octahydrocoumarin.

Particularly preferred is a fragrance substance mixture according to the invention, wherein the amount of mixture according to the invention or the amount of compound (E) and compound (Z) (as described herein) is sufficient (a) to mask or reduce the or one or several unpleasant olfactory impression(s) of another fragrance substance in the fragrance substance mixture, and/or (b) to enhance the or one or several pleasant olfactory impression(s) of another fragrance substance in the fragrance substance mixture.

It is also particularly preferred if the total amount of compounds of formula (I) with regard to the total weight of the fragrance substance mixture is 1 wt. % or less, preferably 0.1 wt. % or less, particularly preferably 0.001 wt. % or less.

Another aspect of the present invention relates to a perfumed product, containing a mixture according to the invention as described herein, preferably a fragrance substance mixture according to the invention, particularly a perfume oil, in a sensorially effective amount, wherein the proportion of the mixture or of the fragrance substance mixture or of the compounds of formula (I) with regard to the total weight of the product preferably is in the range of 0.01, preferably 0.1, to 20, preferably 10 wt. %, preferably in the range of 0.1 to 5 wt. %, particularly preferably in the range of 0.25 to 3 wt. %.

What has been stated above applies accordingly to compounds of formula (I) that preferably are to be used or contained as well as, if applicable, to further components of a contained fragrance substance mixture.

For purposes of clarification it has to be mentioned that (perfumed) products according to the invention within the scope of the present text are to be understood as products that have been caused or produced on purpose, but not as naturally occurring substance mixtures, for example such as the ones that can be obtained from plant-based starting materials by means of extraction.

Preferred products are for example perfume extraits, eau de parfums, eau de toilettes, aftershaves, eau de colognes, pre-shave products, splash colognes and perfumed refreshing tissues as well as perfumed or to be perfumed acidic, alkaline and neutral detergents, such as e.g. floor cleaners, window glass cleaners, dishwashing detergents, bathroom and sanitary cleaners, scouring agent, solid or liquid toilet cleaners, toilet sticks, toilet stones (liquid or solid), powdery or foamy carpet cleaners, liquid detergents, powdery detergents, laundry pretreatment agents such as bleaches, soaking agents and stain removers, fabric softeners, laundry soaps, laundry tablets, disinfectants, surface disinfectants as well as air improvers in liquid or gel-like form or applied to a solid carrier, particularly for deodorization of exhaust air from air conditioning and industrial processes, as well as air improvers in the form of aerosol or pump sprays, waxes and polishes such as furniture polishes, floor waxes, shoe creams, strengthening, impregnating or deodorizing textile treatment agents, diapers, sanitary towels, panty liners, plasters, as well as personal care agents such as e.g. solid and liquid soaps, shower gels, shampoos, shaving soap, shaving foams, bathing oils, damp cleaning cloths, cosmetic emulsion of the oil-in-water, water-in-oil and water-in-oil-in-water type such as e.g. skin creams and lotions, face creams and lotions, sun protection creams and lotions, after sun creams and lotions, hand creams and lotions, foot creams and lotions, depilatory creams and lotions, aftershave creams and lotions, tanning creams and lotions, hair care products such as e.g. hair sprays, hair gels, strengthening hair lotions, hair conditioners, permanent or semi-permanent hair dyes, hair forming agents such as cold waves and hair smoothing agents, hair tonics, hair creams and lotions, deodorants and antiperspirants such as e.g. armpit sprays, roll-ons, deo sticks, deo creams, products for decorative cosmetic such as e.g. eyeshadow, makeups, lipsticks, mascara as well as candles, lamp oils, incense sticks, animal litter, cat litter, insecticides, repellents, liquid and gaseous fuels, heating oils and heating gases.

Particularly preferred is a product according to the invention selected from the group consisting of perfume extraits, eau de parfums, eau de toilettes, aftershaves, eau de colognes, pre-shave products, splash colognes, perfumed refreshing tissues, acidic, alkaline and neutral detergents, textile fresheners, ironing aids, liquid detergents, powdery detergents, laundry pretreatment agents, fabric softeners, laundry soaps, laundry tablets, disinfectants, surface disinfectants, air improvers, aerosol sprays, waxes and polishes, personal care agents, hand creams and lotions, foot creams and lotions, depilatory creams and lotions, aftershave creams and lotions, tanning creams and lotions, hair care products, deodorants and antiperspirants, products for decorative cosmetic, candles, lamp oils, incense sticks, insecticides, repellents and fuels.

A product that shall be olfactorily improved by means of reduction of an unpleasant smell (particularly as described above) or by enhancement of a pleasant olfactory aspect (particularly as described herein) can underlie a product according to the invention.

According to a preferred embodiment, the compounds of formula (I) to be used according to the invention or corresponding mixtures thereof or fragrance substance mixtures (as described herein) are adsorbed to a carrier substance that guarantees a fine distribution of compounds inside the product as well as a controlled release during application. Such carriers may be porous inorganic materials such as silica gels, zeolites, gypsums, clay, clay granules, aerated concrete etc. or organic materials such as woods and cellulose-based substances.

The compounds of formula (I) to be used according to the invention or corresponding mixtures thereof or fragrance substance mixtures (as described herein) may also be present in microencapsulated or spray-dried form, as inclusion complexes or as extrusion products and can be added to a product in this form.

If applicable, the properties of such modified compounds of formula (I) to be used according to the invention or of corresponding mixtures thereof or of fragrance substance mixtures (as described herein) can be further optimized by means of so-called "coating" with suitable materials with regard to a more targeted release, wherein preferably wax-like plastic materials such as e.g. polyvinyl alcohol are used.

A microencapsulation of the compounds of formula (I) to be used according to the invention or of corresponding mixtures thereof or of fragrance substance mixtures (as described herein) can take place, for example, by means of the so-called coacervation process with the aid of capsule materials, e.g. of polyurethane-like substances or soft gelatin. Spray-dried compounds of formula (I) can be produced, for example, by means of spray-drying of a substance to be used according to the invention, i.e. of an emulsion or dispersion containing an alcohol of the compound of formula (I) or a corresponding mixture, wherein modified starches, proteins, dextrins and/or plant-based gums can be used as carrier substance. Inclusion complexes can be produced, for example, by means of addition of dispersions, which are or comprise compounds of formula (I) to be used according to the invention or corresponding mixtures thereof, and cyclodextrins or urea derivatives into a suitable solvent, e.g. water. Extrusion products can take place by means of fusion of compounds of formula (I) to be used according to the invention or corresponding mixtures with a suitable wax-like substance and extrusion with subsequent solidification, in a suitable solvent, e.g. isopropanol, if applicable.

The compounds of formula (I) to be used according to the invention or corresponding mixtures thereof or fragrance substance mixtures (as described herein) can be used in many preparations or products, wherein they are preferably combined with one or several of the following excipients or active ingredients:

Preserving agents, abrasives, anti-acne agents, agents against skin aging, antibacterial agents, anticellulite agents, antidandruff agents, anti-inflammatory agents, irritation preventing agents, irritation inhibiting agents, antimicrobial agents, antioxidants, astringents, sweat inhibiting agents, antiseptic agents, antistatic agents, binders, buffers, carrier materials, chelate builders, cell stimulants, cleaning agents, caring agents, depilatory agents, surface active agents, deodorizing agents, antiperspirants, plasticizers, emulsifiers, enzymes, ethereal oils, fibres, fixators, foam builders, foam stabilizers, substances to prevent foaming, foam boosters, fungicides, gelatinizing agents, gelforming agents, hair care products, hair forming products, smoothing agents, moisturizing agents, dampening substances, moist-keeping substances, bleaching agents, (textile-)strengthening agents, stain removing agents, optical brightening agents, impregnating agents, dirt-repellent agents, friction-lowering agents, lubricants, moisturizing creams, ointments, opacifiers, plasticizing agents, covering agents, polish, glazing agents, polymers, powders, proteins, regreasing substances, abrasive agents, silicones, skin soothing agents, skin cleaning agents, skin caring agents, skin healing agents, skin lightening agents, skin protecting agents, skin softening agents, cooling agents, skin cooling agents, warming agents, skin warming agents, stabilizers, UV-absorbing agents, UV-filters, detergents, fabric softeners, suspending agents, skin tanning agents, thickening agents, vitamins, oils, waxes, fats, phospholipids, saturated fatty acids, mono- or polyunsaturated fatty acids, α-hydroxy acids, polyhydroxy fatty acids, liquefying agents, dyes, color-protecting agents, pigments, anticorrosives, aromas, flavorings, aromatic substances, polyols, surfactants, electrolytes, organic solvents or silicon derivatives.

According to one embodiment of the present invention a preferred product according to the invention, particularly a deodorant or the like, additionally contains (depending on the desired mode of action) one or several of the following active substances:

(1) antimicrobially active substances that inhibit the development of microorganisms that are responsible for the smell of perspiration; for example Triclosan® (5-chloro-2-(2,4-dichlorophenoxy)phenol), triclocarban, chlorhexidine, chlorhexidine hydrochloride, chlorhexidine diacetate, chlorhexidine digluconate, 2-phenoxyethanol, farnesol, glycerin esters and -ethers such as glyceryl monolaurate, glyceryl monocaprinate, hexoxyglycerin, octoxyglycerin (=ethylhexylglycerin, 3-(2-ethylhexyloxy-1,2-propanediol) or Sensiva® SC 50 (by Schulke & Mayr), aliphatic 1,2-diols such as e.g. 1,2-decanediol (EP 1 269 983), araliphatic alcohols such as for example described in EP 799 174, preferably 4-methyl-4-phenyl-2-pentanol (Vetikol; WO 03/024907) or 2-methyl-4-phenyl-2-butanol (1,1-dimethyl-3-phenylpropanol, alpha,alpha-dimethylphenethylcarbinol), I-menthyl methyl ether as described in WO 02/41861, 2-benzylheptan-1-ol (Jasmol; 2-n-pentyl-3-phenylpropan-1-ol), 2,2-dimethyl-3-phenylpropanol (muguet alcohol; cf. U.S. Pat. No. 4,091,090), antimicrobially active secondary alcohols, such as for example described in WO 2005/004601, particularly 3-methyl-6-phenyl-2-hexanol, 4-(2,4-dimethylphenyl)-2-butanol, 6-(4-isopropylphenyl)-3-methyl-2-hexanol, 4-(2,4,5-trimethylphenyl)-2-butanol, 3,3-dimethyl-4-phenyl-2-butanol, 3-methyl-4-(2-methylphenyl)-2-butanol, 6-(3,4-dimethylphenyl)-2-hexanol, aliphatic carboxylic acids such as 2-hexyloctanoic acid, 2-hexyldecanoic acid, 2-butyloctanoic acid or 2-butyldecanoic acid;

(2) enzyme inhibiting substances that inhibit the effect of enzymes that participate in the formation of smell of perspiration; for example citric acid esters and metal-chelating substances such as EDTA (ethylenediaminetetraacetic acid), EGTA [ethylenebis(oxyethylenenitrilo)-tetraacetic acid] and DTPA (diethylenetriaminepentaacetic acid, pentetic acid);

(3) odor absorbing substances that absorb substances that are responsible for the smell of perspiration; for example zinc rizinoleate, cyclodextrins;

(4) antiperspirants that inhibit sweat secretion and thus eliminate the breeding grounds of bacteria that are responsible for body odor. Astringent metal salts are generally preferably used as antiperspirants, particularly inorganic and organic metal salts of the elements aluminium, zinc, magnesium, tin and zircon as well as their mixtures, wherein particularly halogenides such as aluminium chloride, alkaline aluminium hydroxychlorides, zirconyl oxychlorides and zirconyl hydroxychlorides as well as their mixtures are used. Often these aluminium and zirconium salts and mixtures thereof are also used in a complexed form, wherein as complex builders preferably propylene glycol, polyethylene glycol or glycine are used.

The present invention also relates to a method for producing a perfumed product, particularly a perfumed product according to the invention as described herein, comprising the following steps:

i) Providing a mixture or a fragrance substance mixture according to the invention or a first compound (E) and a second compound (Z) as defined herein, in a weight ratio as defined herein according to the invention, ii) providing one or several further components of the perfumed product to be produced (particularly such as described above), and iii) contacting or mixing the further components provided in step ii) with a sensorially effective amount of the components provided in step i).

As follows from the explanations further above, the mixtures according to the invention, particularly such as described herein as preferred, are suited as odor modifiers, preferably (a) for masking or reducing the or one or several unpleasant olfactory impressions of one or several unpleasantly smelling substances, and/or (b) for enhancing the or one or several pleasant olfactory impressions of one or several pleasantly smelling substances, particularly in combination with (other) fragrance substances as described further above.

Thereby preferred is the use of a mixture according to the invention in a composition, preferably a perfume oil, that contains one or several (further) pleasantly and/or unpleasantly smelling substances, whose unpleasant olfactory impression is masked or reduced by the mixture according to the invention and/or whose pleasant olfactory impression is enhanced by the mixture according to the invention, wherein this/these pleasantly and/or unpleasantly smelling substance or one, several or all of these pleasantly and/or unpleasantly smelling substances is or are selected from the group consisting of alcohols, aldehydes, ketones, ethers, esters and carboxylates, preferably ketones and esters, and/or has or have a molar mass in the range of 150 to 285 g/mol.

Herein described in this context is also a method (a) for masking or reducing the or one or several unpleasant olfactory impressions of one or several unpleasantly smelling substances, and/or (b) for enhancing the or one or several pleasant olfactory impressions of one or several pleasantly smelling substances, comprising the following step:

Mixing of the (a) pleasantly and/or (b) unpleasantly smelling substances with a mixture or fragrance substance mixture according to the invention or, preferably, a first compound (E) and a second compound (Z) as defined herein according to the invention, in a weight ratio as defined herein according to the invention, wherein the amount of mixture or of compounds (E) and (Z) according to the invention is sufficient (a) to enhance the pleasant olfactory impression(s) of the pleasantly smelling substance(s) and/or (b) to mask or to reduce the unpleasant olfactory impression(s) of the unpleasantly smelling substance(s).

As mentioned initially, in the context of the present invention a method for producing a mixture containing or consisting of a first compound (E) and a second compound (Z) is provided, wherein compounds (E) and (Z) are compounds of formula (I) with identical constitutional formula

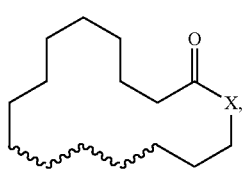

(I)

wherein it applies that one of the four wavy lines denotes a double bond and the remaining wavy lines denote a single bond, respectively, and X is selected from —O—, —CH$_2$— and —O—CH$_2$—, and the first compound (E) is trans-configured and the second compound (Z) is cis-configured, wherein the weight ratio of compound (E) to compound (Z) in the mixture is in the range of 10:90 to 65:30, preferably to 65:35, particularly preferably to 60:40, wherein the mixture comprises one or several compounds selected from the group consisting of cyclohexadec-8-en-1-one, oxacyclohexadecen-2-one, 17-oxacycloheptadec-9-en-1-one, particularly (9Z)-17-oxacycloheptadec-9-en-1-one, and cyclohexadec-5-en-1-one, with the proviso that in case of cyclohexadec-8-en-1-one the weight ratio of compound (E) to compound (Z) in the mixture is not 40.6:30.5 or 20:10, and with the proviso that in case of cyclohexadec-5-en-1-one the weight ratio of compound (E) to compound (Z) in the mixture is not 37:62.

Such a method comprises at least the following steps:

(i) Providing a base mixture containing or consisting of a first compound (E) and a second compound (Z), wherein compounds (E) and (Z) are compounds of formula
(I) with identical constitutional formula

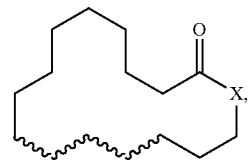

(I)

wherein it applies that one of the four wavy lines denotes a double bond and the remaining wavy lines denote a single bond, respectively, and X is selected from —O—, —CH$_2$— and —O—CH$_2$—, and the first compound (E) is trans-configured and the second compound (Z) is cis-configured, wherein the weight ratio of compound (E) to compound (Z) in the base mixture is higher than 10:90, preferably higher than 60:40, particularly preferably is higher than 65:35 or 65:30, wherein the mixture comprises one or several compounds selected from the group consisting of cyclohexadec-8-en-1-one, oxacyclohexadecen-2-one, 17-oxacycloheptadec-9-en-1-one, particularly (9Z)-17-oxacycloheptadec-9-en-1-one, and cyclohexadec-5-en-1-one, (ii) performing an acid-catalyzed isomerization, preferably with the use of nitric acid, on compound (E) contained in the base mixture, so that a mixture is obtained, wherein the weight ratio of compound (E) to compound (Z) in the mixture is in the range of 10:90 to 65:30, preferably to 65:35, particularly preferably to 60:40, with the proviso that in case of cyclohexadec-8-en-1-one the weight ratio of compound (E) to compound (Z) in the mixture is not 40.6:30.5 or 20:10, and with the proviso that in case of cyclohexadec-5-en-1-one the weight ratio of compound (E) to compound (Z) in the mixture is not 37:62.

Preferred embodiments of this method or compounds to be preferably used arise from the preceding description. Particularly preferably the mixture according to the invention described herein is a mixture that is produced or producible by using a method according to the invention.

An exemplary conduct of method of such a method according to the invention is described in Example 3.

Enrichments of Z-isomer can also be obtained by means of fractional distillation (see hereto also the example section below).

In the following, the present invention will be illustrated in more detail by means of selected examples. Unless otherwise stated, all specifications thereby relate to the weight.

EXAMPLES

Example 1: Perfume Oil P1 Aldehydes

| Component | wt. proportion |
| --- | --- |
| ALDEHYDE C 11 10% in DPG | 16 |
| ALDEHYDE C 11 UNDECYLENE 10% in DPG | 18 |
| ALDEHYDE C 12 LAURIN 10% in DGP | 14 |
| ALDEHYDE C 12 MNA 10% in DGP | 12 |
| HEXENAL TRANS-2 10% in DPG | 1.5 |
| HEXENYL ACETATE CIS-3 | 4 |
| VERTOCITRAL | 7.5 |
| MAGNOLAN | 130 |
| MINTONAT | 35 |
| DIHYDROMYRCENOL | 70 |
| ORANGE OIL | 30 |
| NEROLIONE 10% in DPG | 1 |
| HEXYL ACETATE | 30 |
| JASMAPRUNAT | 18 |
| ALDEHYDE C14 SO-CALLED | 50 |
| FRUITATE | 1.8 |
| ETHYL METHYL BUTYRATE-2 | 8 |
| MANZANATE | 1.2 |
| ALLYL CYCLOHEXYL PROPIONATE | 7 |
| APRIFLOREN | 2 |
| DUPICAL 10% in DPG | 3.5 |
| ETHYL LINALOOL | 57 |
| DIMETHYL BENZYL CARBINYL BUTYRATE | 6.5 |
| ROSE ABS. | 30 |
| ROSAFEN | 20 |
| DAMASCENONE | 1.2 |
| DAMASCONE ALPHA | 1.8 |
| BENZYL ACETATE | 28 |
| HEDIONE | 60 |
| HEXYL CINNAMIC ALDEHYDE ALPHA | 140 |
| PARMANYL | 3.5 |
| MYSORE ACETATE | 35 |
| ISORALDEINE 70 | 28 |
| ISOEUGENOL METHYL ETHER | 3.5 |
| HELIOTROPIN | 3 |
| AGRUMEX LC | 70 |
| AMBROCENIDE 10% in DPG | 0.6 |
| AMBROXIDE | 1.4 |
| | 950 |

The composition has to be described as aldehyde-like, fresh-airy with leavy green, peach-like and ambergris-like scent impressions.

An addition of 10% (with regard to the total weight of the fragrance substances of the group of aldehydes contained in the judged fragrance substance mixture) of an isomer mixture of cyclohexadec-8-en-1-one (here: 60% trans-cyclohexadec-8-en-1-one: 40% cis-cyclohexadec-8-en-1-one) results in a distinct, unexpected increase of the green and fruity scent impressions that remind of green apples.

Example 2: Perfume Oil P2 Alcohols

| Component | wt. proportion |
| --- | --- |
| ALDEHYDE C 12MNA | 5 |
| LINOLAL | 10 |
| VERTOCITRAL | 5 |
| GALBANUM RESIN SYNTH. | 5 |
| MAGNOLAN | 25 |
| MINTONAT | 30 |
| DIHYDROMYRCENOL | 50 |
| ORANGE OIL | 90 |
| PETITGRAIN OIL PARAG. | 10 |
| LAVANDIN GROSSO RCO | 30 |
| HERBOXANE | 30 |
| FREESIOL | 30 |
| LINALOOL | 70 |
| GERANIUM RCO | 30 |
| PHENYL ETHYL ACETATE | 10 |
| PHENYL ETHYL ALCOHOL | 70 |
| CITRONELLOL | 20 |
| GERANIOL | 20 |
| ROSAFEN | 60 |
| BENZYL ACETATE | 50 |
| AMYL CINNAMIC ALDEHYDE ALPHA | 60 |
| YLANG MC TYPE BASE | 20 |
| AMYL SALICYLATE | 50 |
| PARMANYL | 5 |
| ISORALDEINE 70 | 30 |
| EUGENOL | 10 |
| ANISALDEHYDE | 10 |
| HELIOTROPIN | 10 |
| CINNAMYL ACETATE | 10 |
| COUMARIN | 10 |
| CYCLABUTE | 10 |
| HERBAFLORAT | 50 |
| PATCHOULI OIL | 10 |
| AMBROXIDE | 5 |
| CITRYLAL | 10 |
| | 950 |

The composition has to be described as a floral accord of fresh garden flowers with citric scent notes reminding of garden herbs.

The addition of 10% (with regard to the total weight of the fragrance substances of the group of alcohols contained in the judged fragrance substance mixture) of an isomer mixture of cyclohexadec-8-en-1-one (here: 40% trans-cyclohexadec-8-en-1-one: 60% cis-cyclohexadec-8-en-1-one) makes the composition appear much more lively, lighter floral and less herbal.

Example 3: Production of a Mixture According to the Invention (Enrichment of Z-Isomer by Means of Isomerization (e.g. by Using Globalide, Ambrettolide or Velvione))

45 g Ambrettolide (17-oxacycloheptadec-9-en-1-one) (here: 99% (E) and 0.6% (Z)) are dissolved in 225 ml isopropanol and 3.0 g of nitric acid (65%) are added. Subsequently, it is stirred for 8 h at room temperature.

Workup: Soda is added to the batch, it is concentrated on the rotary evaporator and distilled by means of Kugelrohr (KR) distillation.

It can be proceeded in a corresponding manner starting from an isomer mixture of Globalide or Velvione—instead of Ambrettolide—(see the table listed below for details).

Isomerization Results:

| Structure | MG | GC-% educt | GC-% isomerization |
|---|---|---|---|
| Globalide | 238 | 72% E<br>22% Z | 65% E<br>31% Z |
| Ambrettolide | 252 | 99.0% E<br>0.6% Z | 67% E<br>31% Z |
| Velvione | 236 | 37% E<br>62% Z | 21% E<br>78% Z |

Example 4: Production of a Mixture According to the Invention (Enrichment of Z-Isomer by Means of Distillation (of e.g. Globanone))

Apparatus:
4000 ml three-necked flask (DHK), magnetic stirrer (MGR), 1.5 m Sulzer column, mushroom heating hood
2013.2 g Globanone are finely distilled.

| | ST °C. | KT °C. | R:D | mbar | Yield in g |
|---|---|---|---|---|---|
| Fraction 1 to | 187 | 112.2 | 80:2 | 3.8 | 32.6 |
| Fraction 2 to | 191 | 140.7 | 80:2 | 3.0 | 12.8 |
| Fraction 3 to | 193 | 141.5 | 80:2 | 3.0 | 31.4 |
| Fraction 4 to | 196 | 142.0 | 80:2 | 3.0 | 21.9 |
| Fraction 5 to | 197 | 142.3 | 80:2 | 3.0 | 80.3 |
| Fraction 6 to | 198 | 141.7 | 100:2 | 2.9 | 26.7 |
| Fraction 7 to | 198 | 141.9 | 100:2 | 3.0 | 68.2 |
| Fraction 8 to | 198 | 142.2 | 100:2 | 3.0 | 25.5 |
| Fraction 9 to | 199 | 141.5 | 80:2 | 3.0 | 86.4 |
| Fraction 10 to | 200 | 140.4 | 80:2 | 2.7 | 95.1 |
| Fraction 11 to | 198 | 140.6 | 80:2 | 2.7 | 84.3 |

| | ST °C. | KT °C. | R:D | mbar | Yield in g |
|---|---|---|---|---|---|
| Sump sample 1 SP-1 | | | | | |
| Fraction 13 to | 199 | 141.6 | 80:2 | 2.9 | 249.4 |
| Fraction 14 to | 198 | 141.6 | 40:2 | 3.0 | 198.0 |
| Fraction 15 to | 198 | 142.5 | 40:2 | 3.1 | 193.2 |
| Sump sample 2 SP-2 | | | | | |
| Fraction 16 to | 200 | 140.8 | 80:2 | 2.6 | 132.5 |
| Fraction 17 to | 203 | 139.7 | 80:2 | 2.6 | 83.6 |
| Fraction 18 to | 196 | 140.2 | 80:2 | 2.6 | 9.3 |
| Hold Up | — | — | — | — | 55.7 |
| Residue | — | — | — | — | 409 |

27.0 g of the residue are KR distilled.

| 27.0 g Input | T °C. | R:D | mbar | Yield in g |
|---|---|---|---|---|
| KRD-Fr. | 150 | 0:1 | 1.4 | 21.4 |
| KRD-Res. | — | — | — | 5.8 used |

"KRD-2"

| 382 g Input | T °C. | R:D | mbar | Yield in g |
|---|---|---|---|---|
| KRD-Fr. | 153 | 0:1 | 0.9 | 303.4 |
| KRD-Res. | — | — | — | 75.3 |

KRD-2 is distilled again!
Apparatus: 500 ml DHK, MGR, 50 cm FKK (packed column) with Wilson spirals, mushroom heating hood

| Use KRD-2 | ST °C. | KT °C. | R:D | mbar | Yield in g |
|---|---|---|---|---|---|
| RF | 176 | 109 | 1:0 | 0.5 | — |
| Fraction 1 to | 174 | 122 | 80:2 | 0.8 | 11.5 |
| Fraction 2 to | 176 | 125 | 80:2 | 0.9 | 13.6 |
| Fraction 3 to | 179 | 127 | 80:2 | 1.0 | 19.9 |
| Fraction 4 to | 180 | | 80:2 | 0.9 | 14.9 |
| Fraction 5 to | 177 | 130 | 80:2 | 1.1 | 24.0 |
| Fraction 6 to | 176 | 130 | 80:2 | 1.1 | 16.9 |
| Fraction 7 to | 175 | 129 | 80:2 | 1.1 | 13.2 |
| Fraction 8 to | 180 | 149 | 80:2 | 3.4 | 22.4 |
| Sump sample SP-1 | | | | | |
| Fraction 9 to | 184 | 19 | 60:2 | 3.4 | 30.1 |
| Fraction 10 to | 182 | 130 | 60:2 | 1.0 | 36.2 |
| Fraction 11 to | 194 | 135 | 40:2 | 1.3 | 57.3 |
| Hold Up | — | — | — | — | 10.0 |
| Residue | — | — | — | — | 34.2 |

Analyses:

| GC(FGC811)DB-1: | | | | | | | | | | | |
|---|---|---|---|---|---|---|---|---|---|---|---|
| Index | Input | Fr. 1 | Fr. 2 | Fr. 3 | Fr. 4 | Fr. 5 | Fr. 6 | Fr. 7 | Fr. 8 | Fr. 9 | Fr. 10 | % |
| VL | ca. 28 | 3.0 | 3.9 | 1.7 | 0.4 | 0.5 | 0.4 | 0.3 | 0.2 | 0.3 | | Forerun |
| 1856 | | 4.2 | 4.2 | 3.4 | 3.1 | 2.0 | 1.6 | 1.2 | 1.1 | 0.9 | 0.8 | "7-E" |
| 1883 | 68.0 | 60.3 | 81.7 | 80.8 | 82.4 | 83.7 | 85.1 | 83.5 | 82.9 | 81.9 | 82.0 | trans |
| 1888 | 29.8 | 7.5 | 11.0 | 11.8 | 12.8 | 13.9 | 12.8 | 14.9 | 15.7 | 17.0 | 16.9 | cis |
| Index | Input | Fr. 11 | Fr. 12 | Fr. 13 | Fr. 14 | Fr. 15 | Fr. 16 | Fr. 17 | Fr. 18 | Rue | HU | % |
| VL | | 0.3 | 0.2 | 0.1 | 0.1 | — | — | — | 0.1 | — | 0.1 | Forerun |
| 1856 | | 0.7 | 0.5 | 0.5 | 0.3 | 0.2 | 0.2 | 0.2 | 0.2 | — | 0.2 | "7-E" |

| 1883 | 68.0 | 81.9 | 80.5 | 79.3 | 76.5 | 71.3 | 63.7 | 60.0 | 59.3 | 30.5 | 51.4 | trans |
| 1888 | 29.8 | 17.1 | 18.8 | 20.2 | 23.2 | 28.5 | 36.1 | 39.8 | 40.4 | 62.9 | 46.3 | cis |

| Index | Input | KRD | KRD-2 | % |
|---|---|---|---|---|
| VL | | — | — | Forerun |
| 1856 | | — | — | "7-E" |
| 1883 | 68.0 | 30.8 | 30.4 | trans |
| 1888 | 29.8 | 62.6 | 63.2 | cis |
| NL | | 6.6 | 6.4 | Afterrun |

KRD-2-Distillation:

| Index | KRD-2 | Fr. 1 | Fr. 2 | Fr. 3 | Fr. 4 | Fr. 5 | Fr. 6 | Fr. 7 | Fr. 8 | SP-1 | Fr. 9 | Fr. 10 | % |
|---|---|---|---|---|---|---|---|---|---|---|---|---|---|
| VL | — | 0.1 | — | 0.3 | — | — | — | — | — | — | — | — | Forerun |
| 1856 | — | — | 0.4 | 0.3 | — | 0.1 | 0.1 | 0.1 | 0.1 | — | 0.1 | 0.1 | "7-E" |
| 1883 | 30.4 | 34.2 | 35.2 | 40.2 | 35.1 | 34.9 | 35.7 | 33.9 | 32.9 | 26.9 | 32.0 | 32.7 | trans |
| 1888 | 63.2 | 63.4 | 62.4 | 54.8 | 63.1 | 63.1 | 62.0 | 63.8 | 64.3 | 62.5 | 65.5 | 62.2 | cis |
| NL | 6.4 | 2.3 | 2.0 | 4.4 | 1.8 | 1.9 | 2.2 | 2.2 | 2.7 | 10.6 | 2.4 | 5.0 | Afterrun |

| Index | KRD-2 | Fr. 11 | Rue | HU | % |
|---|---|---|---|---|---|
| VL | — | — | — | — | Forerun |
| 1856 | — | 0.2 | 0.1 | 0.4 | "7-E" |
| 1883 | 30.4 | 28.6 | 15.4 | 24.7 | trans |
| 1888 | 63.2 | 66.4 | 46.0 | 61.5 | cis |
| NL | 6.4 | 4.8 | 38.5 | 13.6 | Afterrun |

The invention claimed is:

1. A fragrance substance mixture comprising:
(a) a first compound (E) and a second compound (Z), both having the same chemical formula, wherein the first compound (E) and the second compound (Z) are individually selected from the group consisting of oxacyclohexadecen-2-one and 17-oxacycloheptadec-9-en-1-one, and wherein the first compound (E) is trans-configurated and the second compound (Z) is cis-configurated, and
wherein the first compound (E) and the second compound (Z) are in a weight ratio of 10:90 to 60:40 ((E): (Z)); and
(b) one or more additional fragrance substances that are not compound(s) of formula (I)

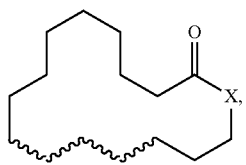

(I)

wherein one of the four wavy lines denotes a double bond and the remaining wavy lines denote a single bond, respectively, and X is selected from —O—, —CH$_2$— and —O—CH$_2$—;
wherein,
the one or more additional fragrance substances of (b) are selected from ketones and esters having a molar mass in a range of 150 to 285 g/mol and exhibit a pleasant olfactory impression,
the first compound (E) and the second compound (Z) are in a total amount in the fragrance substance mixture that enhances the pleasant olfactory impression of the one or more additional fragrance substances of (b), and the total amount of the first compound (E) and the second compound (Z) in the weight ratio of 10:90 to 60:40 enhances the pleasant olfactory impression of the one or more additional fragrance substances of (b) more than the same total amount of the first compound (E) and the second compound (Z) in a weight ratio outside of the weight ratio of 10:90 to 60:40.

2. The fragrance substance mixture according to claim 1, wherein (b) and (a) are in a weight ratio of higher than or equal to 80:20 ((b): (a)).

3. The fragrance substance mixture according to claim 1, wherein (b) and (a) are in a weight ratio of higher than or equal to 90:10 ((b):(a)).

4. The fragrance substance mixture according to claim 1, wherein the esters of the one or more additional fragrance substances of (b) are selected from esters of cyclic alcohols.

5. The fragrance substance mixture according to claim 4, wherein the esters of cyclic alcohols are selected from 2-tert-butylcyclohexyl acetate, 4-tert-butylcyclohexyl acetate, 2-tert-pentylcyclohexyl acetate, 4-tert-pentylcyclohexyl acetate; 3,3,5-trimethylcyclohexyl acetate, decahydro-2-naphthyl acetate, 2-cyclopentylcyclopentyl crotonate, 3-pentyltetrahydro-2H-pyran-4-yl acetate, decahydro-2,5,5,8a-tetramethyl-2-naphthyl acetate, 4,7-methano-3a,4,5,6,7,7a-hexahydro-5,6-indenyl acetate, 4,7-methano-3a,4,5,6,7,7a-hexahydro-5, or 6-indenyl propionate, 4,7-methano-3a,4,5,6,7,7a-hexahydro-5, or 6-indenyl isobutyrate, 4,7-methanooctahydro-5,6-indenyl acetate, and 1-cyclohexylethyl crotonate.

6. The fragrance substance mixture of claim 1, wherein the esters of the one or more additional fragrances substances of (b) are selected from esters of araliphatic alcohols and aliphatic carboxylic acids.

7. The fragrance substance mixture of claim 6, wherein the esters of araliphatic alcohols and aliphatic carboxylic acids are selected from benzyl acetate, benzyl propionate, benzyl isobutyrate, benzyl isovalerianate, 2-phenylethyl acetate, 2-phenylethyl propionate, 2-phenylethyl isobutyrate, 2-phenylethyl isovalerianate, 1-phenylethyl acetate, alpha-trichloromethyl benzyl acetate, alpha, alpha-dimethylphenylethyl acetate, alpha, alpha-dimethylphenylethyl butyrate, cinnamyl acetate, 2-phenoxyethyl isobutyrate, and 4-methoxybenzyl acetate.

8. The fragrance substance mixture of claim 1, wherein the ketones of the one or more additional fragrances substances of (b) are selected from cycloaliphatic ketones.

9. The fragrance substance mixture of claim 8, wherein the cycloaliphatic ketones are selected from 1-(3,3-dimethylcyclohexyl)-4-penten-1-one, 2,2-dimethyl-1-(2,4-dimethyl-3-cyclohexen-1-yl)-1-propanone, 1-(5,5-dimethyl-1-cyclohexen-1-yl)-4-penten-1-one, 2,3,8,8-tetramethyl-1,2,3,4,5,6,7,8-octahydro-2-naphtalenylmethylketone, methyl-2,6,10-trimethyl-2,5,9-cyclododecatrienylketone, and tert-butyl-(2,4-dimethyl-3-cyclohexen-1-yl) ketone.

10. The fragrance substance mixture of claim 1, wherein the one or more additional fragrance substances of (b) are selected from hexyl salicylate, 4-tert-butylcyclohexyl acetate, 2-tert-butylcylcohexyl acetate, benzyl acetate, 2-phenoxyethyl isobutyrate.

11. A fragrance substance mixture comprising:
(a) a first compound (E) and a second compound (Z), both having the same chemical formula, wherein the first compound (E) and the second compound (Z) are individually selected from the group consisting of oxacyclohexadecen-2-one and 17-oxacycloheptadec-9-en-1-one, and wherein the first compound (E) is trans-configurated and the second compound (Z) is cis-configurated, and
wherein the first compound (E) and the second compound (Z) are in a weight ratio of 10:90 to 60:40 ((E): (Z)); and
(b) one or more additional fragrance substances selected from hexyl salicylate, 4-tert-butylcyclohexyl acetate, 2-tert-butylcylcohexyl acetate, benzyl acetate, 2-phenoxyethyl isobutyrate,
wherein the first compound (E) and the second compound (Z) are in a total amount in the fragrance substance mixture that enhances the pleasant olfactory impression of the one or more additional fragrance substances of (b), and
the total amount of the first compound (E) and the second compound (Z) in the weight ratio of 10:90 to 60:40 enhances the pleasant olfactory impression of the one or more additional fragrance substances of (b) more than the same total amount of the first compound (E) and the second compound (Z) in a weight ratio outside of the weight ratio of 10:90 to 60:40.

12. The fragrance substance mixture according to claim 11, wherein the mixture comprises oxacyclohexadecen-2-one.

13. The fragrance substance mixture according to claim 12, wherein the one or more additional fragrance substances of (b) is hexyl salicylate.

14. The fragrance substance mixture according to claim 12, wherein the one or more additional fragrance substances of (b) is 4-tert-butylcyclohexyl acetate.

15. The fragrance substance mixture according to claim 12, wherein the one or more additional fragrance substances of (b) is 2-tert-butylcylcohexyl acetate.

16. The fragrance substance mixture according to claim 12, wherein the one or more additional fragrance substances of (b) is 2-phenoxyethyl isobutyrate.

17. The fragrance substance mixture according to claim 11, wherein the mixture comprises 17-oxacycloheptadec-9-en-1-one.

18. The fragrance substance mixture according to claim 17, wherein the one or more additional fragrance substances of (b) is hexyl salicylate.

19. The fragrance substance mixture according to claim 17, wherein the one or more additional fragrance substances of (b) is 4-tert-butylcyclohexyl acetate.

20. The fragrance substance mixture according to claim 17, wherein the one or more additional fragrance substances of (b) is 2-tert-butylcylcohexyl acetate.

21. The fragrance substance mixture according to claim 17, wherein the one or more additional fragrance substances of (b) is 2-phenoxyethyl isobutyrate.

\* \* \* \* \*